United States Patent Office 3,383,443
Patented May 14, 1968

3,383,443
METHOD OF DYEING SAUSAGE CASING
Thomas E. Leahy and Albin F. Turbak, Danville, Ill., assignors to Tee-Pak, Inc., Chicago, Ill., a corporation of Illinois
No Drawing. Filed Jan. 4, 1965, Ser. No. 423,318
14 Claims. (Cl. 264—78)

ABSTRACT OF THE DISCLOSURE

In the manufacture of cellulosic meat casings wherein viscose is extruded through an annular die at a linear rate of 15–75 feet per minute into a coagulating and regenerating bath and continuously removed and washed to remove reactants and by-products, the casing while in the gel state is continuously dyed prior drying. The casing is continuously fed from the wash bath at a linear speed equal to the rate of extrusion and is passed first through an aqueous alkaline solution of a single naphthol selected from the group consisting of

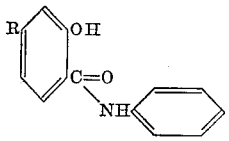

where R is selected from the group consisting of carbocyclic and heterocyclic radicals, including radicals fused to the aromatic nucleus; and derivatives containing substituents only on the anilide radical, the casing having a residence time in the naphthol bath of 1 to 300 sec. preferably about 3–20 sec. The casing is then fed through an aqueous solution of a single fast color salt maintained at a temperature less than about 20° C. and a pH of 2.5–5.9, at the aforementioned extrusion speed, the casing having a residence time in the fast color salt solution of 2–300 sec., preferably about 3–20 sec. The fast color salt used in developing the naphthol color is a stablized diazo salt having a coupling speed with

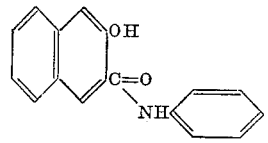

at least as fast as

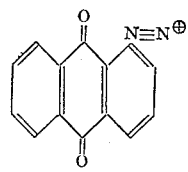

and no faster than

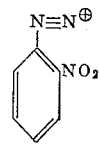

This invention relates to new and useful improvements in methods of preparing cellulosic sausage casings and, more particularly, to a method of preparing cellulosic sausage casings in various colors ranging from red and yellow through orange and brown.

Large diameter sausages, such as bolognas and the like, are produced by a method in which a meat emulsion is stuffed into a cellulose casing and the sausage then smoked and cooked. For some types of sausages, the cellulose casings used are a transparent or clear regenerated cellulose tubular film. In certain types of sausages, however, where close size control of the sausage product is required, cellulose casings are used which contain a fibrous reinforcement.

Cellulose casings used in the preparation of various sausages are normally prepared by extruding a viscose solution through a die having an annular orifice into a coagulating and regenerating bath. The regenerated cellulose tubing is washed to remove by-products and residual acid or salts from the coagulating and regenerating bath. The casing is impregnated with a softening agent, such as glycerin, and finally dried.

When casings are prepared having a fibrous reinforcement, a tube of fibrous paper (preferably a long fiber hemp paper) is formed and passed adjacent to the annular orifice of the extrusion die so that the paper tube is impregnated and coated with viscose. The impregnated and coated tube is passed through a coagulating and regenerating bath to produce regenerated cellulose within the fibrous paper and on the surfaces of the paper as a substantial coating. The final product, known in the trade as fibrous casing, consists of about 35–40 percent fibrous paper and 60–65 percent regenerated cellulose and softening components. The fibrous casing is washed to remove impurities and dried in a manner similar to that described for the unreinforced or clear casing.

The preparation of colored casings has long presented problems in the art of casing manufacture. While casings are made primarily of regenerated cellulose and thus can be colored or dyed with dyes of the type used in the dyeing of cotton and rayon, it has not been practical to use fabric or yarn dyeing techniques in the preparation of colored casings. Generally, it is not practical to provide dyeing tanks of a size sufficient to permit the soaking of casings in dyes for extended periods of time. The preparation of colored casings, particularly those with fast colors, has been accomplished as part of the general processing of the casing at the time of manufacture. When a casing is dyed in a process which is in series with the production of the casing, the casing is moved at a relatively high rate of speed through the dye bath, as compared to the speed of dyeing of fabrics and yarns, with the result that it has proved quite difficult to produce desired colors that do not vary substantially in different lots of casings.

There have been attempts to dye cellulose casings on a commercial scale using vat dyes and naphthol dyes. In fact, some major manufacturers use vat dyes extensively in the coloring of cellulosic casings. Vat dyes produce colors which are somewhat reproducible and which are relatively fast. However, there is evidence that many vat dyes are carcinogenic, and so it is doubtful that they will ever be approved for the coloring of casings or packaging materials which come in contact with foods. Naphthol dyes have been used in the production of colored casings in various colors ranging from reds and yellows through dark browns. In the past, however, naphthol dyes have been used in the coloring of cellulosic casing in systems which utilized two or more naphthol components in combination with two or more fast color salts to produce the desired colors. These dyeing systems were extremely difficult to control, and conditions were not employed which resulted in reproducible colors.

Accordingly, it is one object of this invention to provide a new and improved method of producing cellulosic sausage casings that are uniformly and reproducibly colored.

Another object of this invention is to provide a method of producing cellulosic sausage casings which are colored or dyed in sequence with the manufacture of the casings at a continuous and relatively high linear speed.

A feature of this invention is the provision of a new and improved process for the production of colored cellulosic sausage casings wherein the casing is passed through a bath of a single naphthol and then through a bath of a single fast color salt.

Another feature of this invention is the provision of an improved method for dyeing cellulosic sausage casings continuously by passing the casings through a bath of a single naphthol and then through a bath of a rapid coupling fast color salt while maintaining continued stability of the dyeing system by carefully controlling conditions of temperature and pH.

Other objects and features of this invention will become apparent from time to time throughout the specification and claims as hereinafter related.

Summary of the invention

In the manufacture of cellulosic meat casings, viscose is extruded through an annular die at a linear rate of 15–75 feet per minute into a coagulating and regenerating bath usually consisting of ammonium sulfate, sodium sulfate, and sulfuric acid. In some cases, the viscose is extruded first into a coagulating bath of ammonium sulfate and a small amount of sulfuric acid and then into a regenerating bath containing a higher proportion of sulfuric acid. The cellulosic tube which is formed is continuously removed and washed to remove reactants from the coagulating and/or regenerating bath and by-products which are formed during the regeneration of the cellulose. When a fibrous casing is manufactured, the system is modified to insert a fibrous paper, preferably a long fiber hemp paper, into the casing. The fibrous paper is continuously formed into a tube and passed through a die having an annular orifice which extrudes viscose to impregnate and coat the paper. The impregnated and coated paper is then passed through a coagulating and regenerating bath to produce a paper-reinforced casing which consists of about 35–40 percent paper and 60–65 percent regenerated cellulose and softening or plasticizing ingredients. In the production of both clear (unreinforced) casings and fibrous casings, one or more of the wash baths (preferably following the dyeing baths) is provided with glycerin or other suitable plasticizing ingredients to soften the regenerated cellulose product.

The cellulosic casing (either unreinforced or fibrous casing) is passed from the wash tank into an alkaline solution of a single naphthol selected from the group consisting of

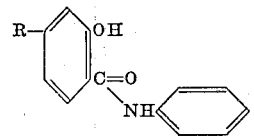

where R is selected from the group consisting of carbocyclic and heterocyclic radicals, including radicals fused to the aromatic nucleus, and derivatives containing substituents only on the anilide radical. At the speed of casing production, the casing will have a residence time in the naphthol solution ranging from 1–300 seconds, preferably in the range from 3–20 seconds.

From the naphthol bath, the casing is continuously fed through an aqueous solution of a fast color salt maintained at a temperature less than about 20° C. (preferably less than 15° C.) and buffered with a suitable acid-salt mixture (e.g., sodium acetate-acetic acid) to a pH of about 2.5–5.9. The casing has a residence time in the fast color salt ranging from about 2–300 seconds, preferably 3–20 seconds. The fast color salt used is a stabilized diazo salt having a coupling speed with

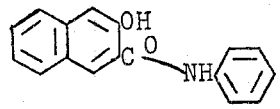

at least as fast as

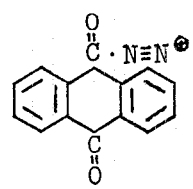

and no faster than

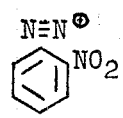

Under the above-mentioned conditions, it is possible to continuously dye cellulosic meat casings in colors that are relatively reproducible and at relatively high speeds. The dye baths are stable for periods up to 30 hours. The usual change period for the naphthol and fast color salt solutions ranges from 8–30 hours, preferably from about 11–22 hours.

In carrying out this process, any naphthol component of the class described may be used. Naphthols which are suitable for this process include, but are not necessarily limited to, the following:
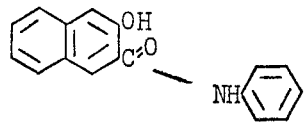
NAPHTHOL A-S
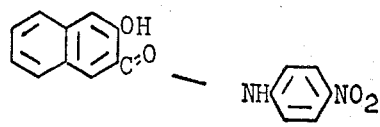
NAPHTHOL AS-AN
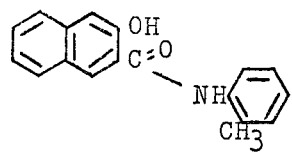
NAPHTHOL AS-D
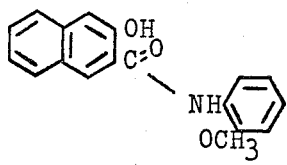
NAPHTHOL AS-OL
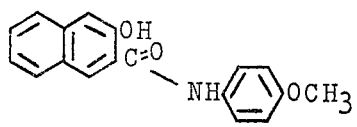
NAPHTHOL AS-RL
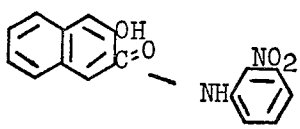
NAPHTHOL AS-BS
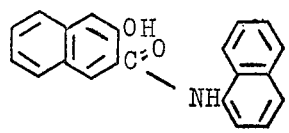
NAPHTHOL AS-BO
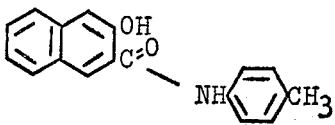
CIBANAPHTHOL RT
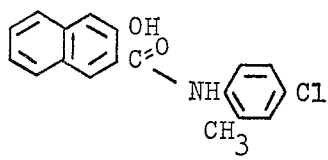
NAPHTHOL AS-TR
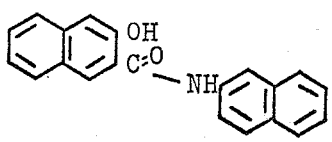
NAPHTHOL AS-SW
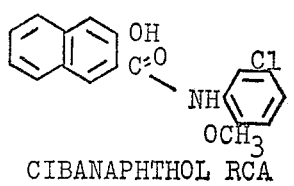
CIBANAPHTHOL RCA
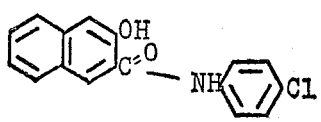
NAPHTHOL AS-E
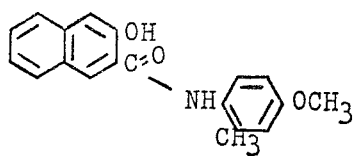
NAPHTHOL AS-LT
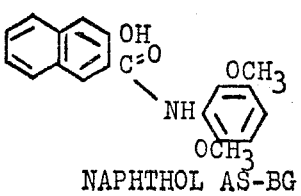
NAPHTHOL AS-BG

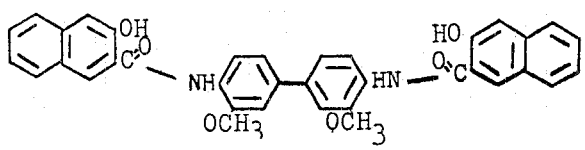
NAPHTHOL AS-BR
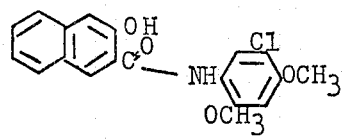
NAPHTHOL AS-ITR
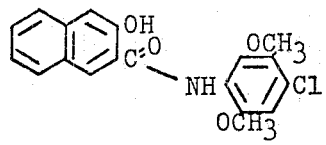
NAPHTHOL AS-LC
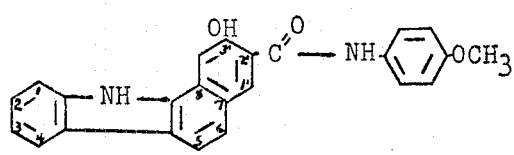
NAPHTHOL AS-SG
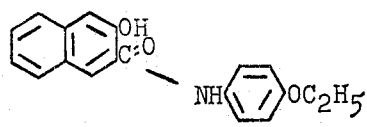
CIBANAPHTHOL RPH
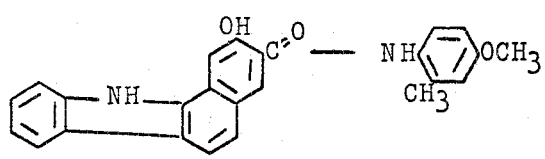
NAPHTHOL AS-SR
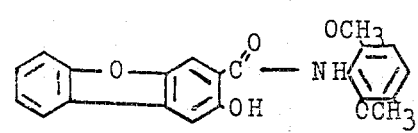
NAPHTHOL AS-BT
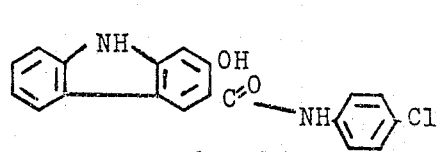
NAPHTHOL AS-LB The fast color salts which are used in this process are stabilized diazo salts having a relatively critical coupling speed as described above. The fast color salts which can be used in this process include any stabilized diazo salts having the specified coupling speed, including but not necessarily limited to, the following:

Example 1

A fibrous casing was continuously prepared and dyed a light yellow-red (known in the trade as Suntan) using the improved process of this invention.

A fibrous casing was continuously prepared as de-

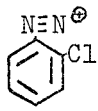
FAST YELLOW GC

FAST ORANGE GC

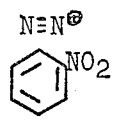
FAST ORANGE GR

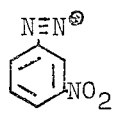
FAST ORANGE R

FAST ORANGE GGD

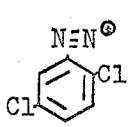
FAST SCARLET GG

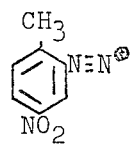
FAST SCARLET G

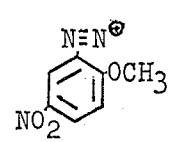
FAST SCARLET R

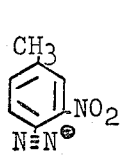
FAST RED GL

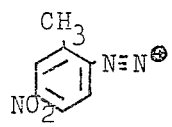
FAST RED RL

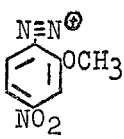
FAST RED B

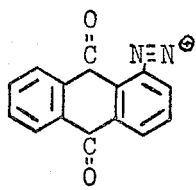
FAST RED AL

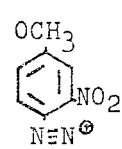
FAST BORDEAUX GP

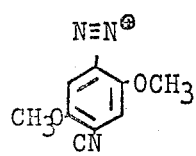
FAST BORDEAUX BD

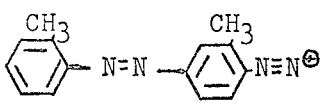
FAST GARNET GB

FAST ORANGE RDN

These fast color salts are commercially obtainable in a stabilized form as described by K. Venkataraman in The Chemistry of Synthetic Dyes, 1952, Academic Press Inc. The fast color salts are diazonium salts which are stabilized in the form of diazonium sulfates; diazonium double salts; or diazonium aryl sulfonates.

The following non-limiting examples are illustrative of the scope of this invention:

scribed above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of naphthol AS–RL, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Red AL and is buffered with 2–20 g. per liter acetic acid and 15–5 g. per liter sodium acetate to produce a pH in the range from 2.5–5.9. This solution also contains a small amount of a dispersant (Diazopon SS 837), a chelating agent (e.g., ethylenediaminetetraacetic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce light yellow-red fibrous casing at a high speed and in colors that are relatively reproducible from batch to batch.

Example 2

A fibrous casing was continuously prepared and dyed a light yellow-red (known in the trade as Suntan) using the improved process of this invention.

A fibrous casing was continuously prepared as described above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of Naphthol AS–BG, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Orange GR and is buffered with 2–20 g. per liter acetic acid and 15–5 g. per liter sodium acetate to produce a pH in the range from 2.5–5.9. This solution also contains a small amount of a dispersant (Diazopon SS837), a chelating agent (e.g., ethylenediaminetetraacetic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce light yellow-red fibrous casing at a high speed and in colors that are essentially reproducible from batch to batch.

Example 3

A fibrous casing was continuously prepared and dyed a dark red-brown (known in the trade as Mahogany) using the improved process of this invention.

A fibrous casing was continuously prepared as described above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of Naphthol AS–LB, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Red GL and is buffered with 2–20 g. per liter acetic acid and 15–5 g. per liter sodium acetate to produce a pH in the range from 2.5–5.9. This solution alco contains a small amount of a dispersant (Diazopon SS 837), a chelating agent (e.g., ethylenediaminetetraaectic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce dark red-brown fibrous casing at a high speed and in colors that are relatively reproducible from batch to batch.

Example 4

A fibrous casing was continuously prepared and dyed a dark red using the improved process of this invention.

A fibrous casing was continuously prepared as described above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of Naphthol AS–LT, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

In casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Red AL and is buffered with 2–20 g. per liter acetic acid and 15–5 g. per liter sodium acetate to produce a pH in the range from 2.5–5.9. This solution also contains a small amount of a dispersant (Diazopon SS 837), a chelating agent (e.g., ethylenediaminetetraacetic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce dark red fibrous casing at a high speed and in colors that are relatively reproducible from batch to batch.

Example 5

A fibrous casing was continuously prepared and dyed a reddish orange (known in the trade as Fawn) using the improved process of this invention.

A fibrous casing was continuously prepared as described above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of Naphthol AS–BG, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Orange RDN and is buffered with 2–20 g. per liter acetic acid and 15–5 g. per liter sodium acetate to produce a pH in the range from 2.5–5.9. This solution also contains a small amount of a dispersant (Diazopon SS 837), a chelating agent (e.g., ethylenediaminetetraacetic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce reddish orange fibrous casing at a high speed and in colors that are relatively reproducible from bath to batch.

Example 6

A fibrous casing was continuously prepared and dyed a reddish yellow (known in the trade as Amber) using the improved process of this invention.

A fibrous casing was continuously prepared as described above by passing fibrous paper past a viscose extrusion die into a coagulating and regenerating bath. The casing was continuously prepared at a rate of 40 feet per minute and fed through various wash and dye baths in accordance with this invention. The casing is washed and subsequently plasticized with glycerin following the coagulating and regenerating baths, and if there is any tendency to carry excess acid from the coagulating-regenerating baths, the casing may be passed through a 1 percent solution of sodium hydroxide as a premercerizing treatment.

The casing is fed through a naphthol solution at a rate of 40 feet per minute and has a residence time of 6 seconds in the solution. The naphthol solution contains 0.5–200 g. per liter of Naphthol AS–LT, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol component in the casing. The solution contains preferably 12 g. per liter of Fast Orange GGD and is buffered with 2–20 g. per liter acetic acid and 15–5 g. per liter sodium acetate to produce a pH in the range from 2.5–5.9. This solution also contains a small amount of a dispersant (Diazopon SS 837), a chelating agent (e.g., ethylenediaminetetraacetic acid), and 15–20 g. per liter sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, dried, and reeled.

This process is effective to produce reddish yellow fibrous casing at a high speed and in colors that are relatively reproducible from batch to batch.

Example 7

Large diameter cellulosic meat casings (known in the trade as Miscellaneous Casings) are prepared by extruding viscose through a die having an annular orifice into a regenerating and coagulating bath. The casing may be manufactured at speeds ranging from 15–45 feet per minute and, in some cases, as high as 75 feet per minute. The viscose is extruded into a coagulating and regenerating bath containing ammonium sulfate, sodium sulfate, and sulfuric acid. In some cases, the coagulating and regenerating baths are separated, the coagulating bath being primarily salts and the regenerating bath primarily acid. The casing is washed to remove acids, salts, and by-products and may be passed through a dilute caustic premercerizer bath to neutralize any acid carry-over from the last wash.

The casing is passed successively through a naphthol bath and a fast color salt bath as described in connection with the dyeing of fibrous casing in Examples 1–6 above.

The reaction conditions and concentrations of naphthol and fast color salt were substantially the same for the dyeing of unreinforced regenerated cellulose casing as were used for fibrous casing. A reddish orange color (known in the trade as Fawn) was produced using Naphthol AS–OL in the naphthol solution and Fast Orange RDN in the fast color salt bath.

Example 8

Large diameter cellulosic meat casings (known in the trade as Miscellaneous Casings) are prepared by extruding viscose through a die having an annular orifice into a regenerating and coagulating bath. The casing may be manufactured at speeds ranging from 15–45 feet per minute and, in some cases, as high as 75 feet per minute. The viscose is extruded into a coagulating and regenerating bath containing ammonium sulfate, sodium sulfate, and sulfuric acid. In some cases, the coagulating and regenerating baths are separated, the coagulating bath being primarily salts and the regenerating bath primarily acid. The casing is washed to remove acids, salts, and by-products and may be passed through a dilute caustic premercerizer bath to neutralize any acid carry-over from the last wash.

The casing is passed successively through a naphthol bath and a fast color salt bath as described in connection with the dyeing of fibrous casing in Examples 1–6 above.

The reaction conditions and concentrations of naphthol and fast color salt were substantially the same for the dying of unreinforced regenerated cellulose casing as were used for fibrous casing. A reddish yellow color (known in the trade as Amber) was produced using Naphthol AS–OL in the naphthol solution and Fast Orange GGD in the fast color salt bath.

While we have described our invention fully and completely with special emphasis upon several preferred embodiments, we wish it to be understood that within the scope of the appended claims, the invention may be practiced otherwise than as specifically described herein.

What is claimed is:

1. In the manufacture of cellulosic meat casings wherein viscose is extruded through an annular die at linear rate of 15 to 75 feet per minute into a coagulating and regenerating bath and continuously removed and washed to remove reactants and by-products, the improvement which comprises continuously feeding the cellulosic casing in the gel state at a linear speed equal to the rate of extrusion through an alkaline aqueous solution of a single naphthol selected from the group consisting of

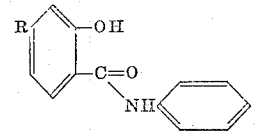

where R is selected from the group consisting of carbocyclic and heterocyclic radicals, including radicals fused to the aromatic nucleus; and derivatives containing substituents only on the anilide radical, said casing having a residence time in the naphthol bath of 1 to 300 sec., and then continuously feeding the casing through an aqueous solution of a single fast color salt maintained at a temperature less than about 20° C. and pH of 2.5–5.9, at said extrusion speed, said casing having a residence time in the fast color salt solution of 2 to 300 sec., said fast color salt being a stabilized diazo salt having a coupling speed with

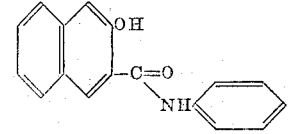

at least as fast as

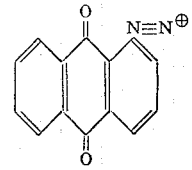

and no faster than

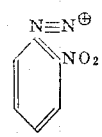

2. A method as defined in claim 1 in which the viscose is extruded with a fibrous reinforcing material.

3. A method as defined in claim 1 in which the casing is passed through a dilute NaOH premercerized bath, containing sufficient alkali to neutralize any acid carried over from the coagulating and regenerating baths, before entering the naphthol solution.

4. A method as defined in claim 1 in which the naphthol is selected from the group consisting of

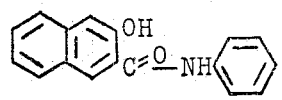

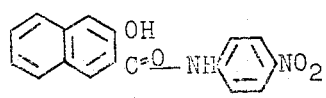

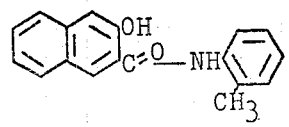

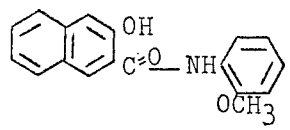 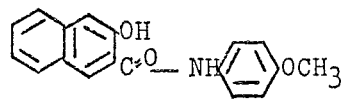
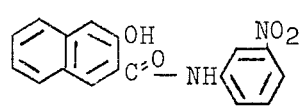 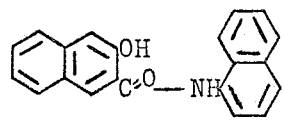
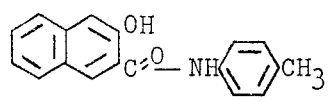 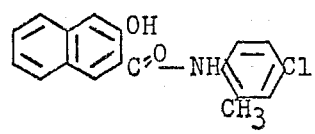
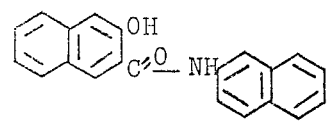 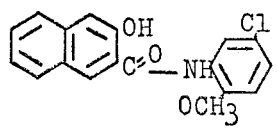
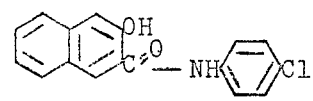 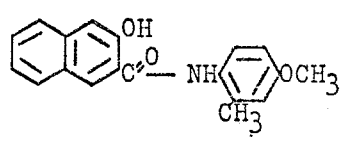
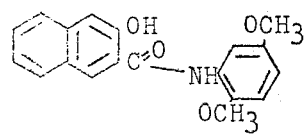
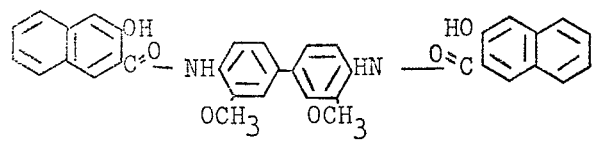
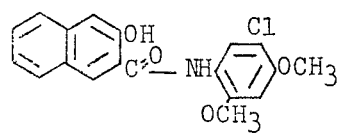 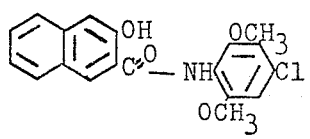

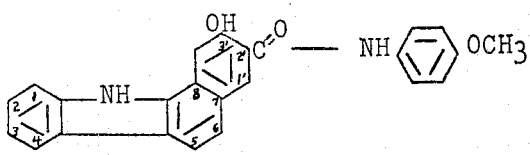
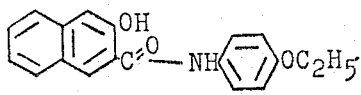
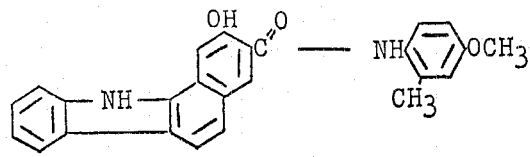
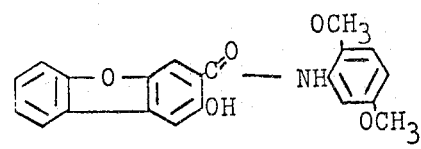
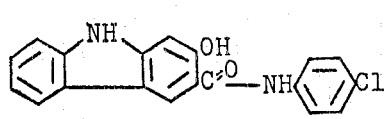
and the stabilized fast color salt is selected from the group consisting of
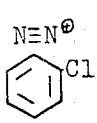 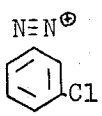 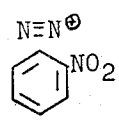
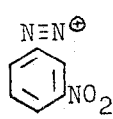 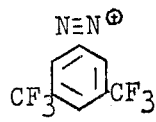 
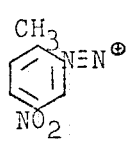 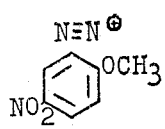 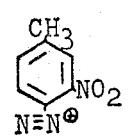
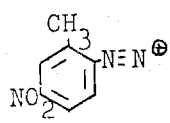 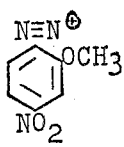 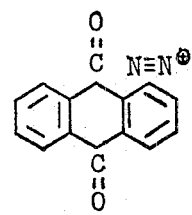
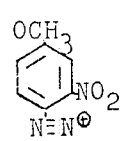 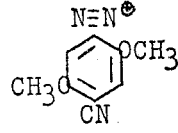 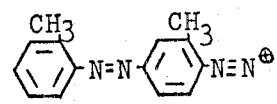
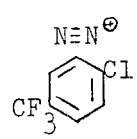

5. A method as defined in claim 4 in which the viscose is extruded with a fibrous reinforcing material.

6. A method as defined in claim 4 in which the casing is passed through a dilute NaOH premercerized bath, containing sufficient alkali to neutralize any acid carried over from the coagulating and regenerating baths, before entering the naphthol solution.

7. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a light yellow-red by continuously feeding the casing at a linear speed equal to the rate of extrusion through a 0.03–1.2 N aqueous alkaline solution containing 0.5–200 g. per liter of

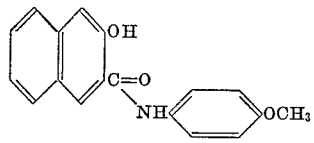

said casing having a residence time of 1 to 300 sec. in the naphthol bath and then continuously feeding the casing at said extrusion speed through an aqueous fast color salt solution containing a substantial stoichiometric excess of a stabilized diazo salt

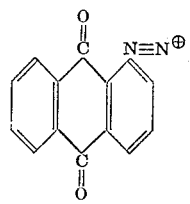

in relation to the naphthol, buffered to a pH of 2.5–5.9 and maintained at a temperature less than about 20° C., said casing having a residence time in the fast color salt solution of 2 to 300 sec.

8. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a light yellow-red by continuously feeding the casing at a linear speed equal to the rate of extrusion through a 0.03–1.2 N aqueous alkaline solution containing 0.5–200 g. per liter of

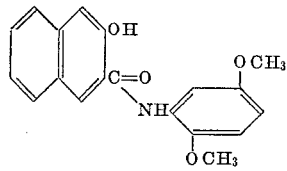

said casing having a residence time of 1 to 300 sec. in the naphthol bath and then continuously feeding the casing at said extrusion speed through an aqueous fast color salt solution containing a substantial stoichiometric excess of a stabilized diazo salt

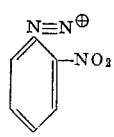

in relation to the naphthol, buffered to a pH of 2.5–5.9 and maintained at a temperature less than about 20° C., said casing having a residence time in the fast color salt solution of 2 to 300 sec.

9. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a dark red-brown by continuously feeding the casing at a linear speed equal to the rate of extrusion through a 0.03–1.2 N aqueous alkaline solution containing 0.5–200 g. per liter of

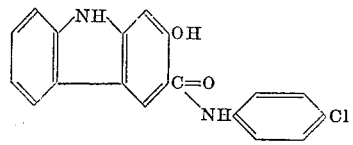

said casing having a residence time of 1 to 300 sec. in the naphthol bath and then continuously feeding the casing at said extrusion speed through an aqueous fast color salt solution containing a substantial stoichiometric excess of a stabilized diazo salt

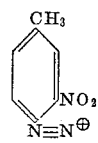

in relation to the naphthol, buffered to a pH of 2.5–5.9 and maintained at a temperature less than about 20° C., said casing having a residence time in the fast color salt solution of 2 to 300 sec.

10. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a dark red by continuously feeding the casing at a linear speed equal to the rate of extrusion through a 0.03–1.2 N aqueous alkaline solution containing 0.5–200 g. per liter of

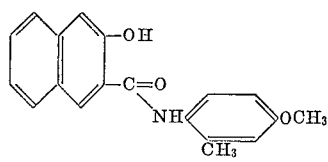

said casing having a residence time of 1 to 300 sec. in the naphthol bath and then continuously feeding the casing at said extrusion speed through an aqueous fast color salt solution containing a substantial stoichiometric excess of a stabilized diazo salt

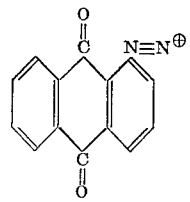

in relation to naphthol, buffered to a pH of 2.5–5.9 and maintained at a temperature less than about 20° C., said casing having a residence time in the fast color salt solution of 2 to 300 sec.

11. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a reddish-orange by continuously feeding the casing at a linear speed equal to the rate of extrusion through a 0.03–1.2 aqueous alkaline solution containing 0.5–200 g. per liter of

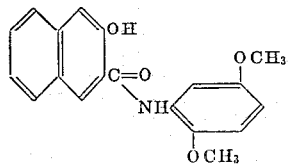

said casing having a residence time of 1 to 300 sec. in the naphthol bath and then continuously feeding the casing at said extrusion speed through an aqueous fast color salt solution containing a substantial stoichiometric excess of a stabilized diazo salt

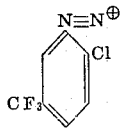

in relation to the naphthol, buffered to a pH of 2.5–5.9 and maintained at a temperature less than about 20° C., said casing having a residence time in the fast color salt solution of 2 to 300 sec.

12. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a reddish-orange by continuously feeding the casing at a linear speed equal to the rate of extrusion through a 0.03–1.2 N aqueous alkaline solution containing 0.5–200 g. per liter of

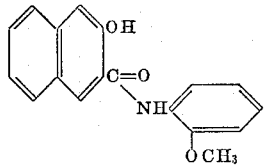

said casing having a residence time of 1 to 300 sec. in the naphthol bath and then continuously feeding the casing at said extrusion speed through an aqueous fast color salt solution containing a substantial stoichiometric excess of a stabilized diazo salt

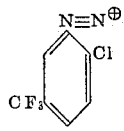

in relation to the naphthol, buffered to a pH of 2.5–5.9 and maintained at a temperature less than about 20° C., said casing having a residence time in the fast color salt solution of 2 to 300 sec.

13. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a reddish-yellow by continuously feeding the casing at a linear speed equal to the rate of extrusion through a 0.03–1.2 N aqueous alkaline solution containing 0.5–200 g. per liter of

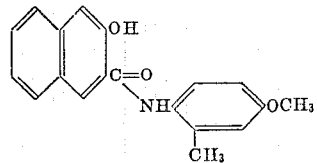

said casing having a residence time of 1 to 300 sec. in the naphthol bath and then continuously feeding the casing at said extrusion speed through an aqueous fast color salt solution containing a substantial stoichiometric excess of a stabilized diazo salt

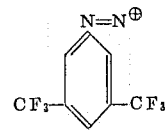

in relation to the naphthol, buffered to a pH of 2.5–5.9 and maintained at a temperature less than about 20° C., said casing having a residence time in the fast color salt solution of 2 to 300 sec.

14. In the manufacture of cellulosic meat casings wherein viscose is extruded through an annular die at a linear rate of 15 to 75 feet per minute into a coagulating and regenerating bath and continuously removed and washed to remove reactants and by-products, the improvement which comprises coloring the casing a reddish-yellow by continuously feeding the casing at a linear speed equal to the rate of extrusion through a 0.03–1.2 N aqueous alkaline solution containing 0.5–200 g. per liter of

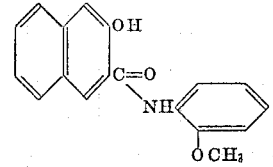

said casing having a residence time of 1 to 300 sec. in the naphthol bath and then continuously feeding the casing at said extrusion speed through an aqueous fast color salt solution containing a substantial stoichiometric excess of a stabilized diazo salt

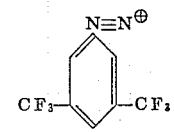

in relation to the naphthol, buffered to a pH of 2.5–5.9 and maintained at a temperature less than about 20° C., said casing having a residence time in the fast color salt solution of 2 to 300 sec.

References Cited
UNITED STATES PATENTS

| | | | |
|---|---|---|---|
| 2,521,101 | 9/1950 | Thor et al. | 99—176 |
| 2,857,283 | 10/1958 | Firth et al. | 99—176 |
| 3,104,682 | 7/1959 | Schenk et al. | 99—176 |
| 3,183,052 | 5/1965 | Sommer et al. | 8—46 |

OTHER REFERENCES

K. Venkaraman: "The Chemistry of Synthetic Dyes," 1952, p. 671, TP 913 U4.

ALEXANDER H. BRODMERKEL, *Primary Examiner.*

T. MORRIS, *Assistant Examiner.*

UNITED STATES PATENT OFFICE
CERTIFICATE OF CORRECTION

Patent No. 3,383,443    Dated May 14, 1968

Inventor(s) Thomas E. Leahy et al.

It is certified that error appears in the above-identified patent and that said Letters Patent are hereby corrected as shown below:

Column 13, line 13, "In" should read -- The --. Column 14, line 10, "bath" should read -- batch --. Column 15, line 41, "dying" should read -- dyeing --. Column 24, lines 15 to 20, "$N\!=\!N^{\oplus}$" should read -- $N\!\equiv\!N^{\oplus}$ --.

Signed and sealed this 6th day of June 1972.

(SEAL)
Attest:

EDWARD M. FLETCHER, JR.
Attesting Officer

ROBERT GOTTSCHALK
Commissioner of Patents